United States Patent
Kim et al.

(10) Patent No.: US 9,112,613 B2
(45) Date of Patent: Aug. 18, 2015

(54) PASSIVE OPTICAL NETWORK REACH EXTENDER BASED ON WAVELENGTH TUNABLE OPTICAL MODULE AND METHOD THEREOF

(71) Applicant: Electronics and Telecommunications Research Institute, Daejeon-si (KR)

(72) Inventors: Kwang-Ok Kim, Jeollabuk-do (KR); Sang-Soo Lee, Daejeon-si (KR); Jong-Hyun Lee, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 33 days.

(21) Appl. No.: 13/974,842

(22) Filed: Aug. 23, 2013

(65) Prior Publication Data

US 2014/0186043 A1    Jul. 3, 2014

(30) Foreign Application Priority Data

Jan. 2, 2013   (KR) .......................... 10-2013-0000306

(51) Int. Cl.
  *H04J 14/00*  (2006.01)
  *H04J 14/02*  (2006.01)
  *H04B 10/29*  (2013.01)

(52) U.S. Cl.
  CPC ............ *H04B 10/29* (2013.01); *H04J 14/0247* (2013.01); *H04J 14/0252* (2013.01); *H04J 14/0282* (2013.01)

(58) Field of Classification Search
  CPC ............. H04B 10/29; H04J 14/02; H04J 3/00
  See application file for complete search history.

(56) References Cited

U.S. PATENT DOCUMENTS

| | | | | |
|---|---|---|---|---|
| 7,289,740 | B1 * | 10/2007 | Brindel et al. | 398/175 |
| 8,275,268 | B2 * | 9/2012 | Kazutaka | 398/173 |
| 8,340,521 | B2 * | 12/2012 | Miura | 398/72 |
| 8,406,625 | B2 * | 3/2013 | Chung et al. | 398/50 |
| 8,666,249 | B2 * | 3/2014 | Zhou et al. | 398/64 |
| 8,688,106 | B2 * | 4/2014 | Hapsari et al. | 455/422.1 |

(Continued)

FOREIGN PATENT DOCUMENTS

KR    10-1211908 A    12/2012

OTHER PUBLICATIONS

Alexander et al;A precompetitive Consortium on Wide-Band All optical networks; 1993, IEEE; 714-735.*

*Primary Examiner* — Daniel Dobson
*Assistant Examiner* — Amritbir Sandhu
(74) *Attorney, Agent, or Firm* — Rabin & Berdo, P.C.

(57) ABSTRACT

Provided are a passive optical network reach extender based on a wavelength tunable optical module and a method thereof. According to an embodiment of the invention, a passive optical network reach extender includes a first optical splitter configured to receive an optical signal from an optical line terminal and split the signal into optical signals having a multiplexed wavelength, a wavelength tunable remote relay configured to receive the optical signals split from the first optical splitter, and select and control an available wavelength for each port, a wavelength multiplexer configured to multiplex a wavelength of the optical signal output from the wavelength tunable remote relay, and a second optical splitter configured to split the optical signal multiplexed by the wavelength multiplexer into a plurality of optical network units.

20 Claims, 5 Drawing Sheets

(56) References Cited

U.S. PATENT DOCUMENTS

| | | | |
|---|---|---|---|
| 8,751,637 B2* | 6/2014 | Okita et al. | 709/224 |
| 2002/0039214 A1* | 4/2002 | Ruan et al. | 359/128 |
| 2002/0145775 A1* | 10/2002 | Effenberger et al. | 359/123 |
| 2003/0030866 A1* | 2/2003 | Yoo | 359/128 |
| 2005/0053375 A1* | 3/2005 | Yoo et al. | 398/53 |
| 2005/0053377 A1* | 3/2005 | Yoo | 398/79 |
| 2007/0147837 A1* | 6/2007 | Yoo et al. | 398/72 |
| 2007/0230956 A1* | 10/2007 | Ikeda et al. | 398/71 |
| 2009/0080890 A1* | 3/2009 | Miura et al. | 398/72 |
| 2009/0129779 A1* | 5/2009 | Bernasconi et al. | 398/79 |
| 2009/0129780 A1* | 5/2009 | Bernasconi et al. | 398/79 |
| 2009/0238571 A1* | 9/2009 | Nakamura et al. | 398/97 |
| 2009/0252493 A1* | 10/2009 | Xu et al. | 398/53 |
| 2010/0061267 A1* | 3/2010 | Katsura et al. | 370/253 |
| 2010/0111532 A1* | 5/2010 | Chen et al. | 398/67 |
| 2010/0135665 A1* | 6/2010 | Lee et al. | 398/99 |
| 2010/0214651 A1* | 8/2010 | Kim et al. | 359/344 |
| 2010/0322626 A1* | 12/2010 | Kim et al. | 398/63 |
| 2011/0129214 A1 | 6/2011 | Zheng | |
| 2011/0135306 A1* | 6/2011 | Kim et al. | 398/68 |
| 2012/0106971 A1* | 5/2012 | Sugaya | 398/97 |
| 2012/0163799 A1* | 6/2012 | Lee et al. | 398/9 |
| 2012/0219287 A1* | 8/2012 | Treyer et al. | 398/27 |
| 2013/0004174 A1* | 1/2013 | Lee et al. | 398/79 |
| 2013/0028598 A1* | 1/2013 | Cavaliere et al. | 398/34 |
| 2013/0058654 A1* | 3/2013 | Guo | 398/66 |
| 2013/0102303 A1* | 4/2013 | Hapsari et al. | 455/422.1 |
| 2013/0287396 A1* | 10/2013 | Cavaliere et al. | 398/48 |
| 2014/0023366 A1* | 1/2014 | Zang et al. | 398/58 |
| 2014/0219660 A1* | 8/2014 | Zhu | 398/67 |
| 2014/0269784 A1* | 9/2014 | Kato et al. | 370/535 |

* cited by examiner

PASSIVE OPTICAL NETWORK REACH EXTENDER BASED ON WAVELENGTH TUNABLE OPTICAL MODULE AND METHOD THEREOF

CROSS-REFERENCE TO RELATED APPLICATION

This application claims the benefit under 35 U.S.C. §119(a) of Korean Patent Application No. 10-2013-0000306, filed on Jan. 2, 2013, the entire disclosure of which is incorporated herein by reference for all purposes.

BACKGROUND

1. Field

The following description relates to a passive optical network (PON), and more particularly, to technology for increasing a transmission distance and the number of splits in the passive optical network.

2. Description of the Related Art

A time division multiple access passive optical network (TDMA-PON) is broadly classified as an EPON (Ethernet PON) or a GPON (Gigabit-capable PON). Currently, this technology corresponds to next generation-PON (NG-PON1) technology, which is a 10 Gbps-class TDMA-PON, and 10G-EPON and XG-PON1 (10 Gigabit-capable PON) technologies are standardized.

The ITU-T SG15 standardization group has selected time and wavelength division multiplexed passive optical network (hereinafter referred to as 'TWDM-PON') technology, which is 40 Gbps-class NG-PON2 technology, as standardization technology. The TWDM-PON is technology for providing a broadband service to subscribers using previously standardized XG-PON1 and wavelength multiplexing technology. That is, a transmission rate of 10 Gbps downstream and 2.5 Gbps upstream is supported per wavelength division multiplex (WDM) wavelength. Optical network units (hereinafter referred to as 'ONUs') may provide a service to subscribers by selecting an arbitrary wavelength according to wavelength control from an optical line terminal (hereinafter referred to as 'OLT') using wavelength tunable technology.

A general TWDM-PON link supports four types of XG-PON1 technology for one OLT and supports a transmission rate of 10 Gbps downstream and 2.5 Gbps upstream for each wavelength. In this case, wavelength signals use a fixed wavelength band. In a signal transmission process of the general TWDM-PON link, wavelength signals having four fixed wavelength bands are transmitted through a wavelength multiplexing and de-multiplexing device of the OLT using one optical line. These wavelength signals are respectively transmitted to the ONUs through an optical splitter in a remote node. The ONU receives the signal having a wavelength selected from among four wavelengths and provides a service to subscribers. For this purpose, the ONU may use a wavelength tunable light source.

The general TWDM-PON link supports a transmission rate of from 625 Mbps to 10 Gbps downstream and from 156 Mbps to 5 Gbps upstream per subscriber with a split ratio of 1:64. However, it is inefficient to apply in a subscriber network in terms of costs. That is, when expensive 40 Gbps TWDM-PON equipment is used in a previously installed optical distribution network (hereinafter referred to as 'ODN'), effectiveness of a transmission service decreases due to a small number of subscribers. Therefore, in order to increase the number of subscribers per port of the 40 Gbps TDMA-PON equipment while the existing ODN is directly accommodated, a reach extender capable of providing long-distance transmission and a high split ratio in a 40 Gbps TWDM-PON link is necessary.

SUMMARY

The following description relates to a reach extender based on a wavelength tunable optical module capable of providing long-distance transmission and a high split ratio in a TWDM-PON link and a method thereof.

In one general aspect, there is provided a passive optical network reach extender including a first optical splitter configured to receive an optical signal from an optical line terminal and split the signal into optical signals having a multiplexed wavelength, a wavelength tunable remote relay configured to receive the optical signals split from the first optical splitter, and select and control an available wavelength per port, a wavelength multiplexer configured to multiplex a wavelength of the optical signal output from the wavelength tunable remote relay, and a second optical splitter configured to split the optical signal multiplexed by the wavelength multiplexer into a plurality of optical network units.

The wavelength tunable remote relay may include a plurality of first wavelength tunable optical modules configured to photoelectrically convert a downstream signal having the available is wavelength selected for each port, a framer configured to re-modulate the signal photoelectrically converted by the plurality of first wavelength tunable optical modules for each port and process a transmission frame, and a plurality of second wavelength tunable optical modules configured to electro-optically convert the signal re-modulated in the framer to the downstream signal having the available wavelength selected for each port.

The available wavelength of the first wavelength tunable optical module may be selected using a physical layer OAM frame received from the optical line terminal, selected using an optical network unit management and control interface frame received from the optical line terminal, or selected by a user using a simple network management protocol.

The available wavelength of the second wavelength tunable optical module may be the same as the available wavelength selected in the first wavelength tunable optical module, or may be selected by the user using the simple network management protocol.

The framer may change or increase the number of access subscribers per port of the optical line terminal by switching ports. The framer may perform multi-port switch control such that a predetermined first wavelength tunable optical module among the plurality of first wavelength tunable optical modules is connected with the plurality of second wavelength tunable optical modules and the downstream signal having the available wavelength selected in the predetermined first wavelength optical module is respectively transmitted to the plurality of second wavelength tunable optical modules through the framer, thereby saving energy.

The framer may switch a transmission frame in order to exchange service information and user information between optical line terminals. When the transmission frame including service information or user information from a first optical line terminal is received, the framer may deliver the transmission frame to a second optical line terminal using a port identifier set for is each port.

When available wavelengths of the first and second wavelength tunable optical modules are selected, the framer may perform electro-opto-electric conversion and signal re-modulation for the downstream signal having the selected available wavelength and perform electro-opto-electric conversion, signal re-modulation, and signal multiplexing for an upstream burst optical signal.

The passive optical network reach extender may be located in a remote node.

In another aspect, there is provided a method of extending a passive optical network distance including selecting available wavelengths of a plurality of first wavelength tunable optical modules and a plurality of second wavelength tunable optical modules per port during a registration process with an optical line terminal, performing opto-electro-optic conversion and signal re-modulation for a signal having the available wavelength selected for each port through a framer, and distributing the re-modulated signal into a plurality of optical network units.

In selecting the available wavelength per port, the available wavelength of the first wavelength tunable optical module may be selected using a physical layer OAM frame received from the optical line terminal or an optical network unit management and control interface frame.

In selecting the available wavelength per port, the available wavelength of the second wavelength tunable optical module may be selected to be the same available wavelength selected in the first wavelength tunable optical module.

In selecting the available wavelength per port, the available wavelengths of the first and second wavelength tunable optical modules may be selected by a user using a simple network management protocol.

In performing the electro-opto-electric conversion and the signal re-modulation, the framer may change or increase the number of access subscribers per port of the optical line is terminal by switching ports.

In performing the electro-opto-electric conversion and the signal re-modulation, the transmission frame may be switched in order to exchange service information and user information between optical line terminals.

Furthermore, the method of extending a passive optical network distance may further include performing electro-opto-electric conversion, signal re-modulation, and signal multiplexing for an upstream burst optical signal.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, exemplary embodiments of the invention will be described in detail with reference to the accompanying drawings. When it is determined that detailed explanations of related well-known functions or configurations unnecessarily obscure gist of the embodiments, the detailed description thereof will not be repeated. The terminology used herein is defined by considering a function in the embodiments, and meanings may vary depending on, for example, a user or operator's intentions or customs. Therefore, the meanings of terms used in the embodiments should be interpreted based on the scope throughout this specification.

Figure 1:
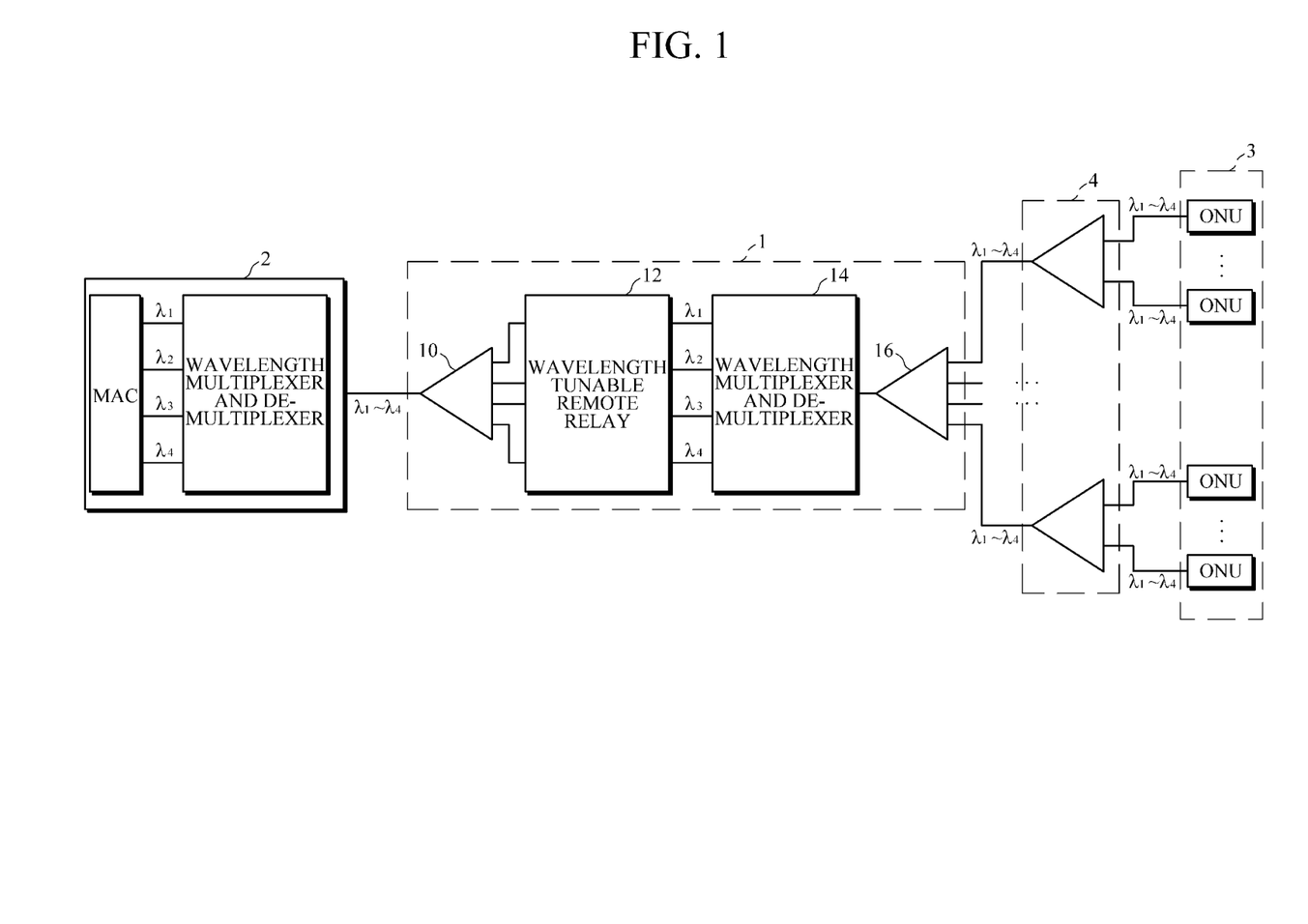
FIG. 1 is a diagram illustrating a configuration of a network system including a PON reach extender according to an embodiment of the invention.

FIG. 1 is a diagram illustrating a configuration of a network system including a passive optical network reach extender (hereinafter referred to as a 'reach extender') 1 according to an embodiment of the invention.

The network system of the invention refers to a passive optical network (hereinafter referred to as 'PON') system, and more particularly, may be a time and wavelength division multiplexed passive optical network (hereinafter referred to as a 'TWDM-PON') system, which is next-generation optical subscriber network technology.

The invention provides a reach extender including a wavelength tunable optical module in order to extend a transmission distance and the number of splits in a 40 Gbps TWDM-PON link, and a method thereof. In particular, the invention has a quadruple split number in one port of an optical line terminal (hereinafter referred to as 'OLT') using reach extending technology based on a frame supporting four multi-wavelengths. Therefore, it is possible for users to provide a service using only one port of the OLT at a time at which service usage is small, for example, at night, thereby saving energy.

Furthermore, the invention allows a conventional ONU to receive four wavelengths by dynamically selecting and controlling an available wavelength using a wavelength tunable OLT optical module and an optical network unit (hereinafter referred to as an 'ONU') optical module. Moreover, the invention provides a service information exchange switching channel between OLTs.

Meanwhile, while this specification describes the reach extender 1 having four ports in a 40 Gbps TWDM-PON system in order to facilitate understanding of the invention, the invention is not limited thereto and the system may have a structure with four or more ports.

Hereinafter, a configuration of the reach extender 1 having characteristics described above will be described below in detail with reference to FIG. 1.

As illustrated in FIG. 1, the reach extender 1 has a one-to-one connection with an OLT 2, and is connected with an ONU 3 through four optical distribution networks (hereinafter referred to as 'ODNs'). The reach extender 1 includes a first optical splitter 10, a wavelength tunable remote relay 12, a wavelength multiplexer and de-multiplexer 14, and a second optical splitter 16.

The first optical splitter 10 is connected with one OLT 2 through one optical fiber. The wavelength multiplexer and de-multiplexer 14 and the second optical splitter 16 are connected with the ONU 3 through four ODNs. While a conventional ODN uses an optical splitter with a is split ratio of 1:64, the reach extender 1 of the invention may provide a split ratio of 1:256. The reach extender 1 may be located in a remote node.

Wavelength signals having four fixed wavelength bands are transmitted to the first optical splitter 10 through the wavelength multiplexer and de-multiplexer of the OLT 2 using one optical line. The first optical splitter 10 receives optical signals from the OLT 2 and splits the signals into optical signals having four multiplexed wavelengths. The wavelength tunable remote relay 12 having four multi-ports receives the optical signals split from the first optical splitter 10, selects and controls an available wavelength per port, and outputs the wavelength. Specifically, the wavelength tunable remote relay 12 may include four wavelength tunable ONU optical modules, a framer, and four wavelength tunable OLT optical modules. One wavelength band is assigned to a signal transmitted through each wavelength tunable ONU optical module by the OLT 2 or a user. The framer performs signal re-modulation and port switching for each port. One wavelength band is also assigned to a signal transmitted through each wavelength tunable OLT optical module. A specific configuration of the wavelength tunable remote relay 12 will be described below in detail with reference to FIG. 2.

The wavelength multiplexer and de-multiplexer 14 multiplexes optical signals output from the wavelength tunable remote relay 12 or de-multiplexes optical signals transmitted from the ONU 3 and then transmits the de-multiplexed signals to the wavelength tunable remote relay 12. The second optical splitter 16 splits optical signals multiplexed by the wavelength multiplexer and de-multiplexer 14 and transmits the split signals to the ONU 3 through a third optical splitter 4.

Figure 2:
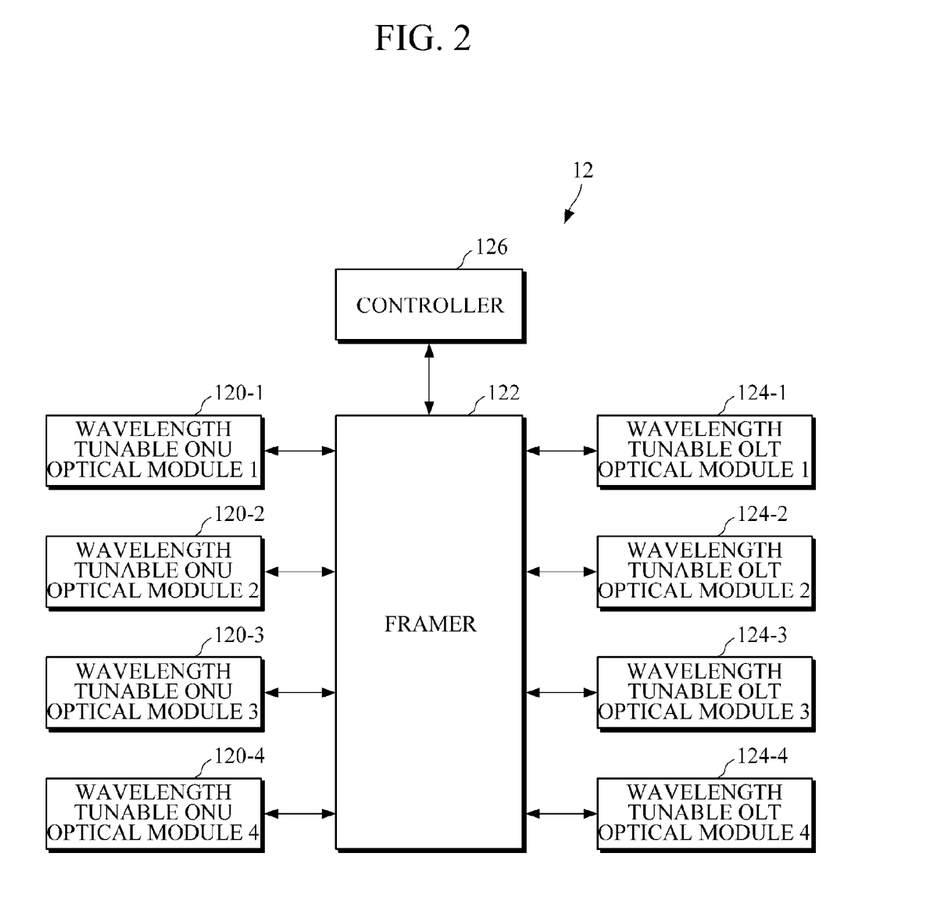
FIG. 2 is a diagram illustrating a specific configuration of a wavelength tunable remote relay according to the embodiment of the invention.

FIG. 2 is a diagram illustrating a specific configuration of the wavelength tunable remote relay 12 according to the embodiment of the invention.

As illustrated in FIGS. 1 and 2, the wavelength tunable remote relay 12 includes four is wavelength tunable ONU optical modules 120-1, 120-2, 120-3, and 120-4, a framer 122 having four ports, four wavelength tunable OLT optical modules 124-1, 124-2, 124-3, and 124-4, and a controller 126.

According to the embodiment, the four wavelength tunable OLT optical modules 124-1, 124-2, 124-3, and 124-4 may be replaced by a fixed wavelength OLT optical module for XG-PON1. That is, it is possible to provide terminal access for conventional XG-PON1 ONUs through four fixed wavelength OLT optical modules for XG-PON1.

The wavelength tunable remote relay 12 uses the wavelength tunable ONU optical modules 120-1, 120-2, 120-3, and 120-4 and the wavelength tunable OLT optical modules 124-1, 124-2, 124-3, and 124-4 to perform opto-electro-optic conversion for transmission signals, and re-modulates frame level signals using the framer 122.

According to the embodiment, selecting and controlling available wavelengths of the wavelength tunable ONU optical modules 120-1, 120-2, 120-3, and 120-4 may be performed using a physical layer OAM (hereinafter referred to as 'PLOAM') frame or an optical network unit management and control interface (hereinafter referred to as 'OMCI') frame, or using a simple network management protocol (hereinafter referred to as 'SNMP') channel by a user.

According to the embodiment, available wavelengths of the wavelength tunable OLT optical modules 124-1, 124-2, 124-3, and 124-4 may be selected and controlled to be the same available wavelengths of the wavelength tunable ONU optical modules 120-1, 120-2, 120-3, and 120-4 in one-to-one correspondence with the wavelength tunable OLT optical module, or may be selected and controlled by the user using an SNMP channel.

The framer 122 processes an XG-PON transmission convergence (hereinafter referred to as 'XGTC') frame according to the standard XG-PON1 and performs, for example, a registration is process with the OLT 2, and transmission and reception of a PLOAM message and an OMCI message. In addition, the framer 122 multiplexes upstream burst frames received from the ONU 3 through four ports and transmits the multiplexed frame to the OLT 2 through one port.

The controller 126 is a CPU processor module that processes an OMCI frame and transmits an SNMP packet, and exchanges service information and user information with the OLT 2 through the framer 122.

Figure 3:
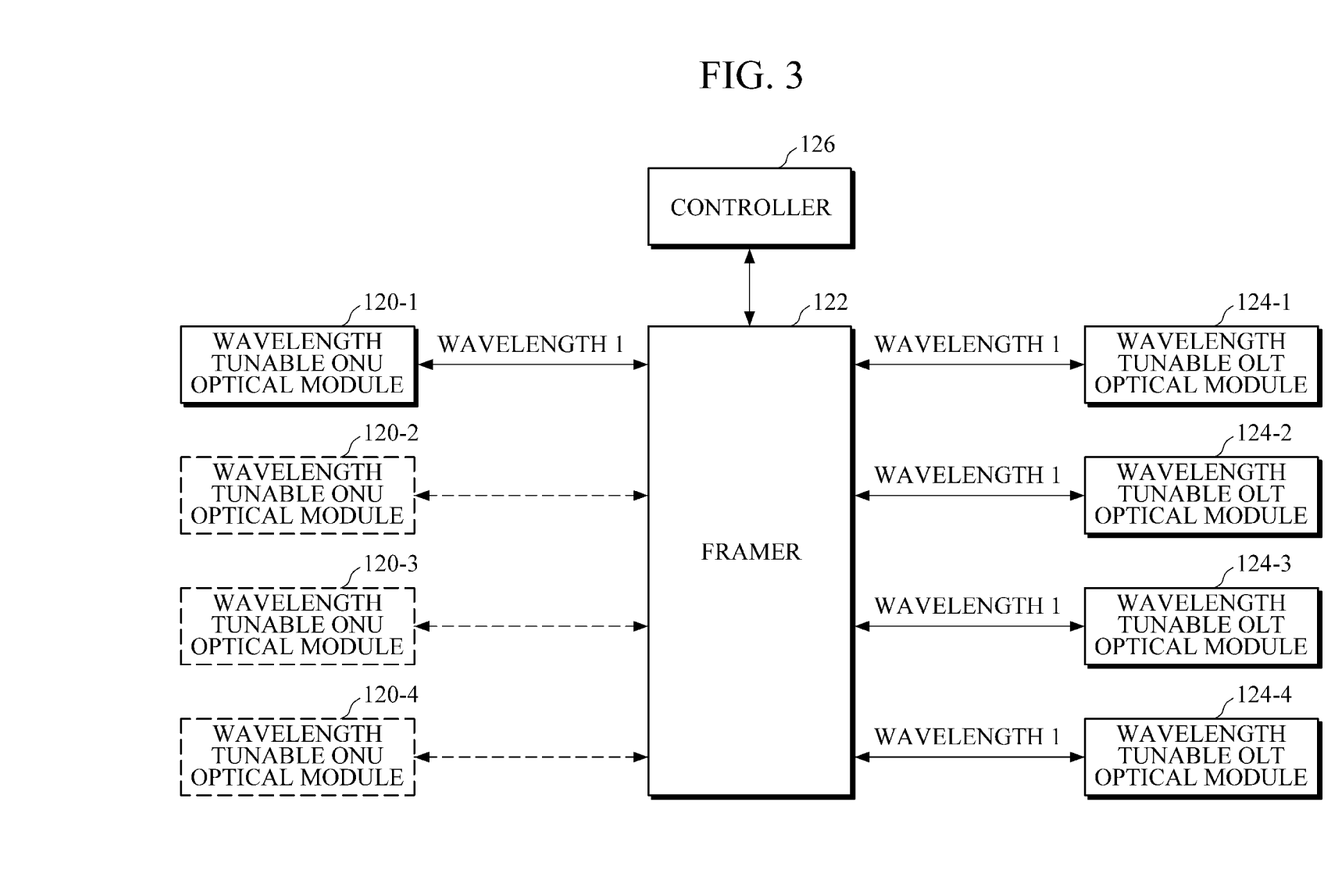
FIG. 3 is a reference diagram illustrating an example structure for supporting 1:4 multiplexing of the wavelength tunable remote relay according to the embodiment of the invention.

FIG. 3 is a reference diagram illustrating an example structure for supporting 1:4 multiplexing of the wavelength tunable remote relay 12 according to the embodiment of the invention.

As illustrated in FIGS. 1 and 3, one wavelength tunable ONU optical module 120-1 is connected with four wavelength tunable OLT optical modules 124-1, 124-2, 124-3, and 124-4 through the framer 122 in 1:4 correspondence. Accordingly, one PON port of the OLT 2 may be connected with four different ODNs. In this case, since the OLT 2 does not necessarily use the remaining three PON ports, it is possible to save energy. Moreover, using the structure described above, it is possible to effectively operate a network during low traffic usage time, for example, at night.

In the above-described structure, a downstream signal is broadcast to the four wavelength tunable OLT optical modules 124-1, 124-2, 124-3, and 124-4. On the other hand, the wavelength tunable OLT optical modules 124-1, 124-2, 124-3, and 124-4 receive a burst upstream signal from the ONU 3 according to time allocation of the OLT 2. The framer 122 multiplexes the upstream signal and transmits the multiplexed signal to one wavelength tunable ONU optical module 120-1.

According to the embodiment, the available wavelengths of the wavelength tunable OLT is optical modules 124-1, 124-2, 124-3, and 124-4 may be selected by the user or may be selected to be the same available wavelength selected in the wavelength tunable ONU optical module 120-1.

Figure 4:
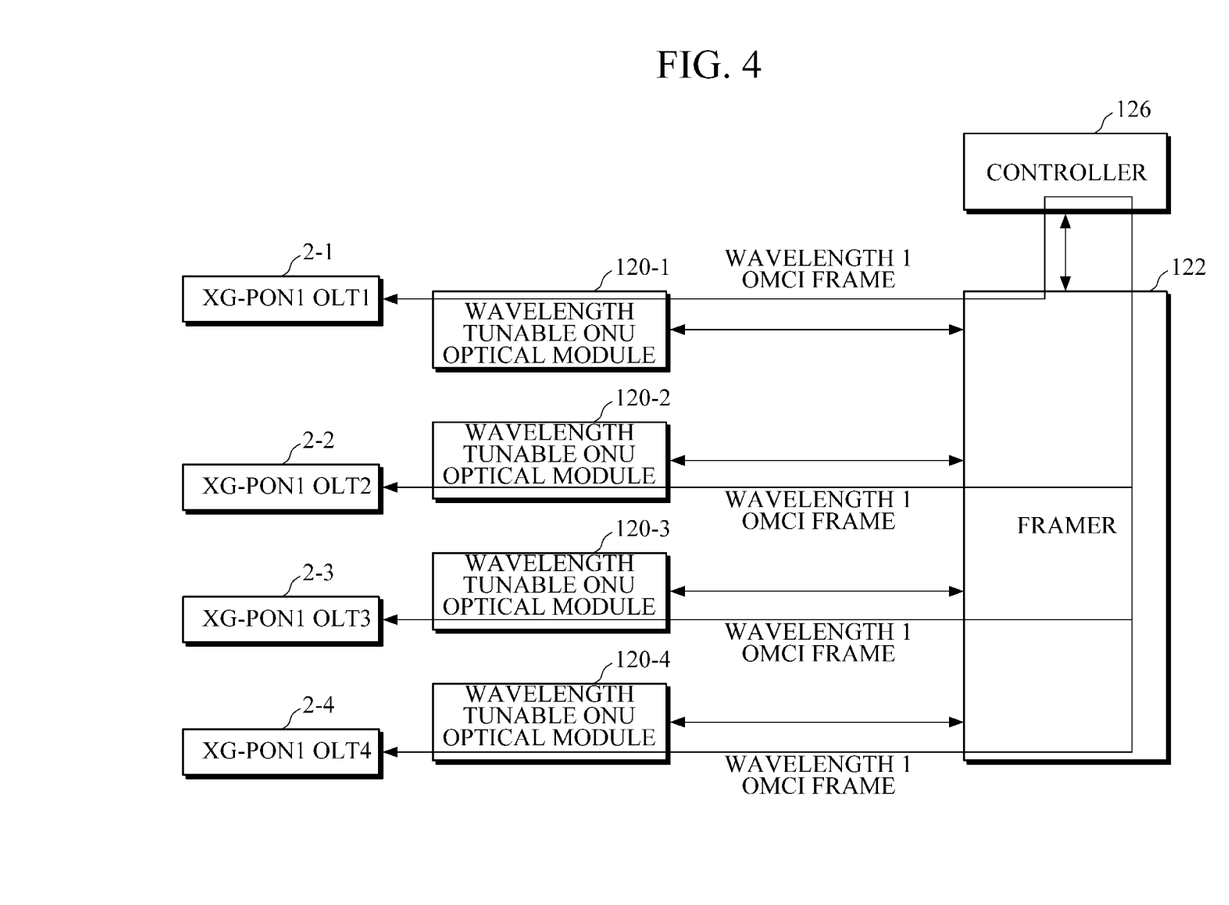
FIG. 4 is a reference diagram illustrating an example of an OMCI frame switching service for exchanging information between OLTs according to the embodiment of the invention.

FIG. 4 is a reference diagram illustrating an example of an OMCI frame switching service for exchanging information between OLTs according to the embodiment of the invention.

As illustrated in FIGS. 2 and 4, in order to provide an open subscriber network architecture, it is necessary to exchange service information and user information among XG-PON1 OLTs 2-1, 2-2, 2-3, and 2-4. For this purpose, the wavelength tunable remote relay 12 supports information exchange among different XG-PON1 OLTs through an OMCI frame switching of the framer 122.

For example, it is assumed that the XG-PON1 OLT 1 2-1 provides service information to the XG-PON1 OLTs 2, 3, and 4 2-2, 2-3, and 2-4. In this case, the wavelength tunable remote relay 12 performs switching to a port ID of an XGPON encapsulation method (XGEM) frame by including service information in the OMCI frame. For this purpose, each port of the OLT needs to be set to a unique XGEM frame port ID and the wavelength tunable remote relay 12 may deliver the OMCI frame to a corresponding XG-PON1 OLT using the XGEM frame port ID.

Figure 5:
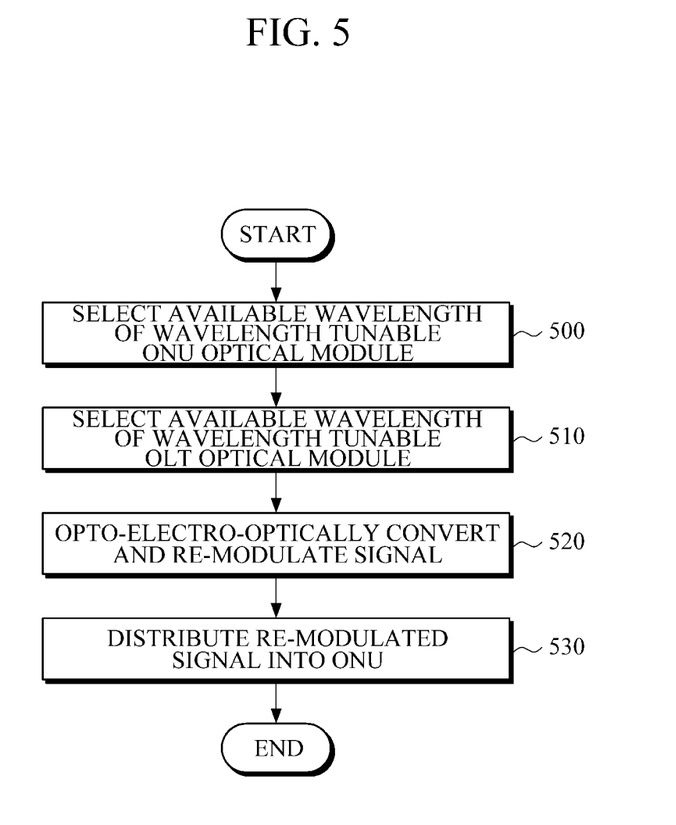
FIG. 5 is a flowchart illustrating a method of extending a distance of a reach extender according to the embodiment of the invention.

FIG. 5 is a flowchart illustrating a method of extending a distance of the reach extender 1 according to the embodiment of the invention.

As illustrated in FIGS. 2 and 5, during a registration process with the OLT, the reach extender 1 selects available wavelengths of the wavelength tunable ONU optical modules 120-1, 120-2, 120-3, and 120-4 for each port (500) and selects available wavelengths of the wavelength tunable OLT optical modules 124-1, 124-2, 124-3, and 124-4 for each port (510).

According to the embodiment, in selecting of the available wavelengths of the wavelength tunable ONU optical modules 120-1, 120-2, 120-3, and 120-4 (500), the reach is extender 1 may select available wavelengths of the wavelength tunable ONU optical modules 120-1, 120-2, 120-3, and 120-4 using a PLOAM frame or an OMCI frame received from the OLT. Otherwise, the user may select available wavelengths of the wavelength tunable ONU optical modules 120-1, 120-2, 120-3, and 120-4 using the SNMP.

According to the embodiment, in selecting of the available wavelengths of the wavelength tunable OLT optical modules 124-1, 124-2, 124-3, and 124-4 (510), the reach extender 1 may select the same available wavelengths of the wavelength tunable OLT optical modules 124-1, 124-2, 124-3, and 124-4 as available wavelengths selected in the wavelength tunable ONU optical modules 120-1, 120-2, 120-3, and 120-4. Otherwise, the user may select available wavelengths of the wavelength tunable OLT optical modules 124-1, 124-2, 124-3, and 124-4 using the SNMP.

Subsequently, the reach extender 1 performs opto-electro-optic conversion and signal re-modulation for a signal having the available wavelength selected for each port through the framer 122 (520), and distributes the re-modulated signal into the ONU (530).

According to the embodiment, in performing of the electro-opto-electric conversion and the signal re-modulation (520), in the reach extender 1, the framer 122 may change or increase the number of access subscribers per port of the OLT by switching ports.

According to the embodiment, in performing of the electro-opto-electric conversion and the signal re-modulation (520), the reach extender 1 may switch the transmission frame in order to exchange service information and user information between the OLTs.

According to another embodiment, the reach extender 1 may further include performing electro-opto-electric conversion, signal re-modulation, and signal multiplexing for an upstream burst optical signal.

While the present invention has been particularly described with reference to exemplary embodiments, it will be understood by those of skilled in art that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims will be construed as being included in the present invention.

According to the embodiment, in the PON system, and particularly, in the 40 Gbps TWDM-PON system, it is possible to dynamically provide long-distance transmission and a high split ratio, accommodate four times the subscriber access per one PON port of the conventional method using a 1:4 switching structure, and save energy by turning off unused PON ports.

Further, it is possible to select available wavelengths of the wavelength tunable ONU optical module and the wavelength tunable OLT optical module, and switch control for exchanging service information between the OLTs using the transmission frame. In this way, the next-generation optical subscriber network technology, TWDM-PON, can be effectively operated.

The present invention can be implemented as computer-readable code in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed among computer systems over a network such that is computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A passive optical network reach extender comprising:
   a first optical splitter configured to receive an optical signal from an optical line terminal and split the signal into optical signals having a multiplexed wavelength;
   a wavelength tunable remote relay configured to receive the optical signals split from the first optical splitter, and select and control an available wavelength for each port;
   a wavelength multiplexer configured to multiplex a wavelength of the optical signal output from the wavelength tunable remote relay; and
   a second optical splitter configured to split the optical signal multiplexed by the wavelength multiplexer into a plurality of optical network units.

2. The passive optical network reach extender according to claim 1, wherein the wavelength tunable remote relay includes:
   a plurality of first wavelength tunable optical modules configured to photoelectrically convert a downstream signal having the available wavelength selected for each port;
   a framer configured to re-modulate the signal photoelectrically converted by the plurality of first wavelength tunable optical modules for each port and process a transmission frame; and
   a plurality of second wavelength tunable optical modules configured to electro-optically convert the signal re-modulated in the framer to the downstream signal having the available wavelength selected for each port.

3. The passive optical network reach extender according to claim 2, wherein the available wavelength of the first wavelength tunable optical module is selected using a physical layer OAM frame received from the optical line terminal.

4. The passive optical network reach extender according to claim 2, wherein the available wavelength of the first wavelength tunable optical module is selected using an optical network unit management and control interface frame received from the optical line terminal.

5. The passive optical network reach extender according to claim 2, wherein the available wavelength of the first wavelength tunable optical module is selected by a user using a simple network management protocol.

6. The passive optical network reach extender according to claim 2, wherein the available wavelength of the second wavelength tunable optical module is the same as the available wavelength selected in the first wavelength tunable optical module.

7. The passive optical network reach extender according to claim 2, wherein the available wavelength of the second wavelength tunable optical module is selected by the user using the simple network management protocol.

8. The passive optical network reach extender according to claim 2, wherein the framer changes or increases the number of access subscribers per port of the optical line terminal by switching ports.

9. The passive optical network reach extender according to claim 8, wherein the framer performs multi-port switch control such that a predetermined first wavelength tunable optical module among the plurality of first wavelength tunable optical modules is connected with the plurality of second wavelength tunable optical modules and the downstream signal having the available wavelength selected in the predetermined first wavelength optical module is respectively transmitted to the plurality of second wavelength tunable optical modules through the framer, thereby saving energy.

10. The passive optical network reach extender according to claim 2, wherein the framer switches the transmission frame in order to exchange service information and user information between optical line terminals.

11. The passive optical network reach extender according to claim 10, wherein, when the transmission frame including service information or user information is received from a first optical line terminal, the framer delivers the transmission frame to a second optical line terminal using a port identifier set for each port.

12. The passive optical network reach extender according to claim 2, wherein, when the available wavelengths of the first and second wavelength tunable optical modules are selected, the framer performs electro-opto-electric conversion and signal re-modulation for the downstream signal having the selected available wavelength and performs electro-opto-electric conversion, signal re-modulation, and signal multiplexing for an upstream burst optical signal.

13. The passive optical network reach extender according to claim 1, wherein the passive optical network reach extender is located in a remote node.

14. A method of extending a passive optical network distance, comprising:
selecting available wavelengths of a plurality of first wavelength tunable optical modules and a plurality of second wavelength tunable optical modules for each port during a registration process with an optical line terminal;
performing opto-electro-optic conversion and signal re-modulation for a signal having the available wavelength selected for each port through a framer; and
distributing the re-modulated signal into a plurality of optical network units.

15. The method according to claim 14, wherein, in selecting the available wavelength per port, the available wavelength of the first wavelength tunable optical module is selected using a physical layer OAM frame received from the optical line terminal or an optical network unit management and control interface frame.

16. The method according to claim 14, wherein, in selecting the available wavelength per port, the available wavelength of the second wavelength tunable optical module is selected to be the same available wavelength selected in the first wavelength tunable optical module.

17. The method according to claim 14, wherein, in selecting the available wavelength per port, the available wavelengths of the first and second wavelength tunable optical modules are selected by a user using a simple network management protocol.

18. The method according to claim 14, wherein, in performing the electro-opto-electric conversion and the signal re-modulation, the framer changes or increases the number of access subscribers per port of the optical line terminal by switching ports.

19. The method according to claim 14, wherein, in performing the electro-opto-electric conversion and the signal re-modulation, the transmission frame is switched in order to exchange service information and user information between optical line terminals.

20. The method according to claim 14, further comprising performing electro-opto-electric conversion, signal re-modulation, and signal multiplexing for an upstream burst optical signal.

* * * * *